Patented Apr. 24, 1951

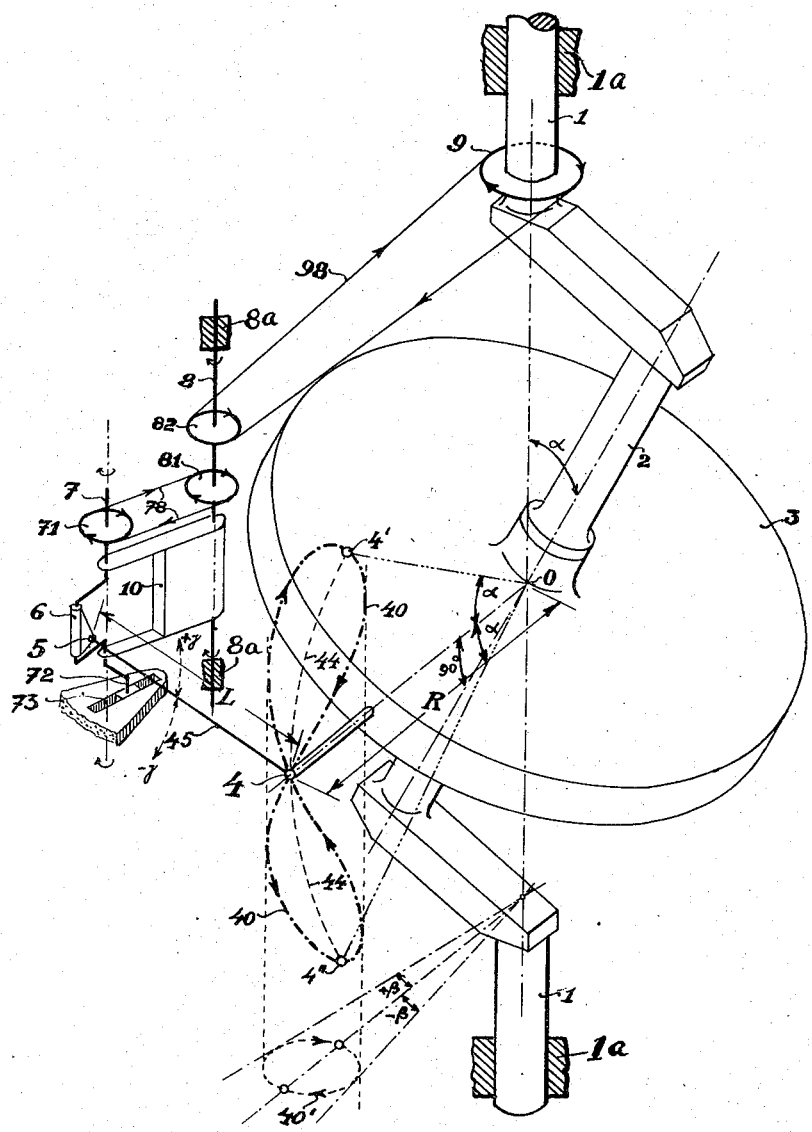

2,550,612

UNITED STATES PATENT OFFICE 2,550,612

WOBBLE DRIVE MECHANISM

Edmund Ernst Karl Sparmann,
Stockholm, Sweden

Application August 2, 1948, Serial No. 42,116
In Sweden August 4, 1947

8 Claims. (Cl. 74—60)

The present invention relates to a combined guiding and anchoring means for the wobble member in a wobble drive for transferring a reciprocatory movement to a rotary movement about an engine or system axis being substantially parallel with the path of the reciprocatory movement, or vice versa.

As is well known, it is of fundamental importance for a satisfactory operation that the wobble member, or wobble plate or wobble plate crown, as it is also called, is prevented from participating in the rotation of the engine or system shaft with respect to the engine or system casing whereas all radii of the wobble plate plane perform—as viewed in the longitudinal direction of the engine shaft—mutually phase-displaced but otherwise equally large angular oscillations about the engine shaft, it being understood, however, that all points positioned in the wobbler plate plane, actually will move in lemniscate-like loop lines positioned in a spherical surface.

In, for instance, piston engines which employ the wobble plate principle for transforming the rectilinear piston movements into a rotating movement about an engine shaft parallel with the paths of the pistons, or vice versa, it is thus indispensable to secure that all connecting joints for the piston movements move in mutually congruent three-dimensional lemniscate paths if it shall be at all possible to effect a dynamic balancing of the mass forces set up during operation. Only provided that this theoretical fundamental requirement is met, the conditions of acceleration of all reciprocating masses (pistons, et cetera) will become mutually similar, or equivalent respectively to those occurring in an ordinary planary crank motion having a connecting rod of infinite length.

The solutions and arrangements heretofore known for obtaining this rather complicated lemniscate movement in a definite path have either been too complicated or they have not been able to withstand the loads and stresses occurring during operation, or else they have obstructed an appropriate design and dimensioning of other vital elements. In most cases no regard has been paid to the deformations occurring in every machine during operation. As a consequence, it has hitherto not been possible to utilize in practice the great possibilities and advantages which are obtainable with the aid of the wobble plate principle in a correct and appropriate design.

The present invention constitutes a very simple solution of this fundamental problem in the design of wobble drive machines, which solution also meets all practical machine-technical requirements. The invention consists substantially therein that an anchoring link resistive to tensile and compressive stresses and extending substantially tangential to the wobble plate, is jointedly coupled at its one end to a point on the wobble plate positioned in the wobble plate plane and at its other end to an anchoring point positioned on a movable engine part which is positively controlled from the engine shaft, said movable engine part compelling said anchoring point to perform such a composite movement with respect to the engine casing as to cause a meridian plane, which passes through the geometrical axis of the system or engine shaft and also through the wobble plate point, to perform for each complete revolution of the engine shaft two complete substantially harmonic oscillations about the said axis with an angle of deflection of $\pm\beta$ counted from a mean position, $\sin\beta$ being as nearly as possible equal to $$\frac{1-\cos\alpha}{1+\cos\alpha}$$

where $\alpha$ indicates the angle of inclination between the geometrical axis of the wobble plate and the centre line of the system shaft.

On the accompanying drawing there is shown a perspective view which schematically illustrates one of several possible realizations of the inventive idea; it should be noted that in said illustration it has been necessary, in order to obtain a clear and comprehensive representation of the specific features and mode of operation of the mechanism, to exaggerate or distort most proportions in respect to normal values, in the first instance the angle of inclination $\alpha$ of the inclined crank pin of the engine or system shaft being exaggerated, and also to arrange and dimension the individual elements of the mechanism in a manner which may be less suitable from the point of view of a practical design.

In the said drawing, the system or engine shaft I has in this instance the shape of a Z in that the crank pin 2 is inclined with respect to the axis of rotation of the shaft, the shaft being rotatably mounted with respect to suitable support means such as the engine casing by bearing indicated at Ia. The centre lines of the crank pin and of the engine shaft intersect under an angle $\alpha$ in a point 0 termed the centre of the wobble plate. The plane extending through the point 0 at right angles to the crank pin 2 is termed the wobble plate plane. In order to be able to illustrate more clearly the outstanding features of the invention, all details, which have no close connection with or no importance for the invention have been left out, so for instance the entire piston movement mechanism including its connecting members, such as ball joints, pivot pins and the like, which in a complete machine are arranged in the wobble plate plane at equal radial distances from the wobble plate centre 0. Such piston mechanisms are, however, known per se and may be devised, for instance, according to the U. S. patent to Woods No. 2,398,486. In the drawing there has been shown only that point 4 in the wobble plate plane is to be pivotally or jointedly anchored or coupled to the point 5 of the movement mechanism by means of the swingable anchoring link 45, resistive to tensile and compressive stresses. Said mechanism is compelled to move in a predetermined path and as shown to the left on the drawing, for this purpose swingably supported on some immovable part of the engine, most suitably on the inside of the engine casing, by means of an intermediate shaft 8 which extends in parallel with the system shaft 1, so that the movable anchoring point 5 of the said mechanism may perform its characteristic composite movement in a plane which extends perpendicularly to the system shaft 1 and preferably passes through the wobble plate centre 0.

In case the anchoring point 5 were not movable but fixedly connected to for instance the engine casing, the point 4, positioned on a radius in the wobble plate plane, would describe part of a line of intersection between two spherical surfaces, the centre of one of said spherical surfaces being the point 0 and that of the other the point 5; the first mentioned spherical surface having a radius corresponding to the distance R between the points 0 and 4 and the other spherical surface a radius equal to the length L of the anchoring link, i. e. equal to the distance between the points 5 and 4. However, as mentioned in the opening paragraphs, it is a fundamental condition for the practical employment of a wobble plate drive that the point 4 shall describe a lemniscate-like three-dimensional loop line of a certain shape and magnitude, since only in that case also all other points in the wobble plate plane, which have the same distance from the wobble plate centre 0, will move in mutually congruent paths.

In the drawing the path of such a movement is indicated by means of the dot-and-dash loop line 40. On account of the perspective representation the loop line appears to be unsymmetrical, but in reality it is fully symmetrical with equally large halves. If the said three-dimensional loop-line is viewed in a direction which is parallel with the system shaft 1, the path of movement 40 of the point 4 will appear as a circle 40', which is traced twice for each complete engine revolution in the same direction of rotation as that of the system shaft 1. Thus, when rotating the system shaft 1 in the direction of the arrow through one revolution, the point 4 will not move along the dotted arcuate line 44 between the dead centres 4' and 4'' but it will trace the entire dot-and-dash loop line 40 in the direction indicated by means of the small arrow heads set out along the loop line.

It follows from the above that point 4 will move both on a spherical surface having the radius R and the centre 0 and on a cylindrical surface the axis of which extends in parallel with the system shaft 1, the diameter $d$ of said cylindrical surface being equal to R $(1-\cos\alpha)$. If two meridian planes are laid through the centre line of the system shaft 1 so as to form tangents to said cylindrical surface on opposite sides thereof, said meridian planes will form an angle with respect to each other of $2\beta$, said angle being defined by the equation sin $$\beta = \frac{1-\cos\alpha}{1+\cos\alpha}$$

It thus follows that a meridian plane which passes through the point 4 will perform two complete harmonic oscillations about the system shaft 1 with the angular amplitudes $\pm\beta$, when the system shaft 1 is rotated through one complete revolution.

Thus, the anchoring point 5 must perform a harmonic oscillation in a direction, which is substantially tangential to the wobble plate, and with a corresponding frequency, i. e. a frequency corresponding to twice the number of revolutions of the engine shaft, and furthermore of such a magnitude that the radius, which passes through the point 4, will make the maximum angular deflections $\pm\beta$ if viewed in the direction of the engine shaft. In the embodiment of the invention disclosed on the drawing said component of the total movement of the anchoring point 5 is brought about by arranging the anchoring point 5 on a sleeve 6 rotatably journalled on the crank pin of a small crank shaft 7, which extends in parallel with the system shaft 1 and derives from the latter a movement of rotation having twice the number of revolutions of the engine and preferably the same direction of rotation. The said force or movement transmission is represented in the drawing by the schematically shown chain drives 9—98—82 and 81—78—71. Obviously, every other kind of transmission may be used as long as the crank shaft 7 obtains twice the number of revolutions and the same direction of rotation as the system shaft 1, and that the crank shaft 7 and the intermediate shaft 8 obtain the same direction and speed of rotation.

In case point 5 were to perform only the recently described movement, a consequence would be that the point 4 would not move along the surface of a straight cylinder but, on account of the limited length L of the anchoring link 45, along a spherical annular surface having substantially a circular cross-section.

In order to compensate for the non-infinite length of the anchoring link 55, there is forced upon the point 5, as previously mentioned, a further superposed harmonic oscillating movement in a direction which is substantially tangential to the wobble plate mechanism, also said superposed motion having a frequency which corresponds to twice the number of revolutions of the engine shaft but being displaced in phase an angle of suitably about 90° with respect to the first mentioned harmonic oscillatory motion of the point 5, the superposed movement being performed along a distance which corresponds to L $(1-\cos\gamma)$, where L represents the length of the anchoring link 45 and the angle $\gamma$ the maximum angle of deviation of the anchoring link 45 towards each side in a direction which is parallel with the system shaft 1, when the angular deviation of the anchoring link is viewed at right angles to the system shaft. If the length L of the anchoring link 45 is determined so that the angular deviation towards each direction becomes less than about 30°, such an arrangement is practically equivalent with a straight guide, so that the path of movement of the point 4 will come to lie on the surface of a straight cylinder in accordance with the theoretical requirements for a practically operable wobble plate drive.

In the embodiment of the inventive idea illustrated in the drawing the last mentioned harmonic oscillatory movement component of the point 5, which is superposed on the first described oscillatory movement with a phase displacement of about 90°, is obtained in the following manner. The small crank shaft 7 is not journalled directly in the engine casing or in some other immovable part of the engine but at the free end of a rocking frame 10 which is adapted to perform a penduluous movement about an intermediate shaft 8. The intermediate shaft 8 is in turn rotatably journalled in suitable bearings 8a in the engine casing or in some other immovable part of the machine. As will be clear from the drawing, the intermediate shaft 8 serves at the same time as a transmission member in the force and movement transmission from the system shaft 1 to the small crank shaft 7, and it has preferably the same direction of rotation as the engine shaft 1 but twice the number of revolutions of the latter. The intermediate shaft 8 and the crank shaft 7 must have the same direction of rotation and the same number of revolutions in order to avoid disturbing influences on the kinematics of the movement mechanism, when the rocking frame 10 oscillates about the intermediate shaft 8.

In the embodiment shown the just mentioned second and superposed oscillatory movement of the point 5 is obtained in a simple manner by providing on the small crank shaft 7 a crank pin 72 which is displaced an angle of 90° with respect to the crank pin that supports the sleeve 6 carrying the point 5, and by making said crank pin 72 slidable in a guide 73 which is stationary with respect to the engine casing and other immovable parts of the machine. The longitudinal direction of the said guide should suitably point towards the intermediate shaft 8, which at the same time defines the axis about which the rocking frame 10 performs its oscillating movement in a direction which is suitably tangential to the wobble plate mechanism. Naturally, the oscillatory movement of the rocking frame 10 may be effected also by other means, for instance by means of a connecting rod which is pivotally connected at one end to the crank pin 72 and at the other end to an immovable part of the machine.

As has been mentioned already at the beginning of this specification certain dimensions and proportions have been considerably exaggerated on the drawing in order to obtain a clear representation. In a practical realization the necessary amplitudes of the oscillatory movements become so small that it would be almost impossible to illustrate the functions of the movement mechanism in the small scale required for a patent drawing. On account of the comparatively small amplitudes required it should also in practice be more suitable to use instead of crank shafts eccentric shafts for the guide mechanism for point 5. Since shafts having crank throws and shafts having eccentrics are functionally equivalent it will be understood that the term crank mechanism or the like as hereinafter employed, is used in its generic sense to include all such functionally equivalent devices. Also in other respects the combined guiding and anchoring mechanism for a wobble plate may be varied in various respects within the scope of the invention. Thus, the two superposed and mutually phase-displaced oscillatory movements of point 5 may be obtained by means of two separate crank shafts or eccentric shafts instead of by means of the common crank shaft 7 shown on the drawing.

The most characteristic feature of the invention is the combination of the swingable anchoring link 45 with a movable anchoring point 5, upon which such a motion characteristic is forced by means of a movement mechanism positively actuated by the engine, that the wobble plate radius jointedly coupled to the said mechanism will perform the theoretically necessary harmonic oscillatory movement about the system shaft 1 with an angle of deflection of $\pm\beta$, $\sin\beta$ being as nearly as possible equal to $$\frac{1-\cos\alpha}{1+\cos\alpha}$$

said oscillatory movement being performed twice for each revolution of the engine shaft and thus with a frequency twice as large as the number of revolutions of the engine.

It should, furthermore, be mentioned that in principle nothing will prevent the provision of more than one guide mechanism for each wobble plate, but such a provision would be unnecessary and would also give rise to a number of practical inconveniences, since the whole system would then be kinematically superdefined, quite apart from the resulting more expensive manufacturing, wherefore it is not recommended to use several of such mechanisms for the anchoring and guiding of one and the same wobbler plate.

I claim:

1. In apparatus of the character described, the combination with a shaft carrying a wobble plate member inclined at an angle to the axis of rotation of the shaft and support means with respect to which said shaft is rotatably mounted, of a motion producing mechanism carried by said support means for imparting to an actuating element constituting a part of said mechanism two superposed oscillations displaced from each other in phase angle in relation to said support means in a direction substantially tangential to said wobble plate member as viewed in a direction parallel with said axis, means providing a positive connection between said shaft and said mechanism for imparting to said oscillations a frequency twice that of said shaft, and a rigid link articulatedly connecting said actuating element and a place on said wobble plate member in the wobble plane thereof, said link being substantially at a right angle to a radius of said wobble plate member.

2. Apparatus as set forth in claim 1 in which said mechanism comprises two coordinated crank mechanisms displaced from each other in phase relation substantially 90° and operatively connected with said shaft to rotate at twice the speed of rotation of the shaft.

3. Apparatus as set forth in claim 2 in which said crank mechanisms are combined in a single unit.

4. Apparatus as set forth in claim 14, in which said mechanism includes a rocking frame having a rocking axis about which the swingable end of the rocking frame is swingable in a direction generally tangential to the wobble plate member, one of said crank mechanisms being journalled at the swinging end of said frame and carrying a rotatably mounted sleeve connected to said link and the other of said crank mechanisms being constructed to impose upon said frame a substantially harmonic oscillation about its rocking axis.

5. Apparatus as set forth in claim 2 in which said mechanism includes a rocking frame having a rocking axis substantially parallel with the axis of rotation of said shaft, said crank mechanism being journaled at the swinging end of said frame and the first of said crank mechanisms being constructed to impose upon said frame a substantially harmonic oscillation about its rocking axis and the second of said crank mechanisms carrying a rotatably mounted sleeve connected to said link.

6. Apparatus as set forth in claim 5 in which an intermediate shaft provides the rocking axis for said frame, said intermediate shaft being positively driven from the wobble plate shaft at twice the speed of the latter and means for transmitting from said intermediate shaft to said crank mechanisms a rotary movement of the same speed and direction of rotation as that of the intermediate shaft.

7. Apparatus as set forth in claim 5 in which said support means includes a guide for guiding said first crank mechanism.

8. Apparatus as set forth in claim 5 in which said first crank mechanism is journaled on a crank rod anchored to said support means.

EDMUND ERNST KARL SPARMANN.

REFERENCES CITED

The following references are of record in the file of this patent:

UNITED STATES PATENTS

| Number | Name | Date |
|---|---|---|
| 1,858,182 | Bramson | May 10, 1932 |
| 2,463,818 | Sparmann | Mar. 8, 1949 |